Patented Apr. 27, 1943

2,317,668

UNITED STATES PATENT OFFICE 2,317,668

RESINOUS COMPOSITIONS

Harold C. Cheetham and Charles L. Levesque, Philadelphia, Pa., assignors to The Resinous Products & Chemical Company, Philadelphia, Pa.

No Drawing. Application May 18, 1940, Serial No. 336,059

12 Claims. (Cl. 260—22)

This invention relates to new resinous compositions obtained by reacting polyhydric alcohols with the long chain polycarboxylic acids that may be recovered from the acidic by-product which occurs in the manufacture of sebacic acid from castor oil.

A method of recovering such polycarboxylic acids is described in copending application, Serial No. 336,058, filed May 18, 1940, which, on December 23, 1941, issued as United States Patent No. 2,267,269.

It has now been found that when these acids are condensed with polyhydric alcohols, unique resinous compositions of rubbery character and permanent plasticity are obtained, the properties of which make them ideally suited for caulking compositions, sealing compositions for cans, tanks, and other containers, and as plasticizers in some coating compositions, particularly those in which color is unimportant.

In the manufacture of sebacic acid from castor oil by heating with strong caustic alkali, the initial reaction products are octanol-2, methyl hexyl ketone, the sodium salt of sebacic acid and the sodium salts of various acids formed by side reactions. The octanol-2 and methyl hexyl ketone are removed by distillation, leaving as a residue the sodium salts of the acids formed. These salts are then dissolved in water and the pH of the solution adjusted to about 6, whereupon an oily layer separates from the aqueous solution. The aqueous phase contains the sodium salt of sebacic acid; the oily layer, the various acids formed by side reactions. In the description of the invention that follows and in the claims the term "by-product acids" is used to designate the mixture of acids that forms this oily layer.

As disclosed in copending application, Serial No. 336,058 these by-product acids can be separated into two fractions, one of which is essentially a mixture of monocarboxylic acids and the other a mixture of polycarboxylic acids, by first acidifying the crude residue with a mineral acid, then drying and distilling under reduced pressure. The distillate, which amounts to about 40% of the by-product acids when the distillation is carried to about 270° C. under 4 mm. pressure, is composed primarily of monobasic acids. The residue under these conditions is primarily a mixture of long chain polycarboxylic acids. This residue is a dark amber, clear, viscous liquid which has an acid number between 140 and 165 and an iodine number of from 45-60. A 70% solution of the residue in toluene has a viscosity of about E to F on the Gardner-Holdt scale.

The long chain polycarboxylic acids contained in the residue react with glycerine to form gels and with glycol to give thick, viscous resinous products. Polyhydric alcohols, such as diethylene glycol, triethylene glycol, and butylene glycol, give products analogous to those obtained with glycol, whereas pentaerythritol, sorbitol, glucose, polyglycerol, etc. give products analogous to those obtained with glycerine. Of these, the resins made with glycerine are the most important. They may be modified by using in conjunction with the glycerine a smaller portion of a glycol, such as diethylene glycol, or by using in conjunction with the long chain polycarboxylic acids obtained from the by-product acids another resin-forming polycarboxylic acid or a fatty monocarboxylic acid. Among the resin-forming polycarboxylic acids that may be used with the long chain polycarboxylic acids derived from the by-product acids may be mentioned phthalic, maleic, malic, tartaric, citric, succinic, adipic, sebacic, etc. Products obtained by the diene addition of maleic acid, or anhydride, to unsaturated compounds, such as rosin, may also be used. Among the monocarboxylic acids that may be used are ricinoleic, linoleic, stearic, and the acids derived from such oils as soya bean, rape-seed, tung, perilla, oiticica, cocoanut, linseed, etc. Glycerolized oils may be used in place of the acid derived from them. The monocarboxylic acids obtained from the by-product acids may also be used to modify the resins in which event the by-product acids may be used at least in part without being first separated. Departures from the ratio of mono- to polycarboxylic acids usually occurring in the by-product acids can be made by the addition of one or the other or of different mono- or polycarboxylic acids. The new resins are formed under conditions well known for the condensation of polyhydric alcohols and polybasic acids, as for example, by heating a mixture of the reactants to a temperature of 185° C. to 240° C. until the acid number is reduced to the desired value and a suitable viscosity is reached.

The following examples illustrate in detail methods of preparing the new resinous materials. The viscosities given in these examples are all measured on the Gardner-Holdt scale.

*Example 1(a)*.—A mixture of 200 parts of residue from the distillation of the by-product acids from the manufacture of sebacic acid and 31 parts of diethylene glycol is heated at 215–220° C.

for sixteen hours. The product is a viscous mass, which is soluble in mineral thinner. A 50% solution in this solvent has a viscosity of E+. The acid number of the product is 18.

(b).—A mixture of 200 parts of residue and 20 parts of glycerol is heated at 200° C. for three hours. A tough, rubbery gel is formed, having an acid number of 46.

*Example 2.*—A mixture of 520 parts of the residue, 280 parts of phthalic anhydride, 250 parts of diethylene glycol, and 56 parts of glycerol is heated at 200 C. until the viscosity of a 50% solution of the product in butyl acetate is C. The product is a semi-elastic mass, insoluble in paraffinic solvents, but soluble in ester-type solvents. It is useful as a modifier for nitrocellulose and in caulking compounds.

*Example 3.*—200 parts of the residue, 400 parts of phthalic anhydride, 400 parts of sebacic acid, 342 parts of diethylene glycol, and 176 parts of glycerol are mixed and the temperature gradually raised to 200° C., where heating is maintained until the viscosity of a 50% solution of the reaction product in butyl acetate is J. When the reaction product is cooled, it is a soft, elastic mass, soluble in ester-type solvents but insoluble in petroleum naphtha. The product is particularly valuable in nitrocellulose lacquers and is also useful in compositions for the sealing of seams in pontoons, tanks, etc.

*Example 4.*—A mixture of 400 parts of the residue, 200 parts of phthalic anhydride, 133 parts of glycerol, and 510 parts of castor oil is heated at 200° C. until the viscosity of a 50% solution of the product in toluene is G. The resulting soft, rubbery mass is useful for modifying nitrocellulose films and as a binder in wall tile.

*Example 5.*—A mixture of 125 parts of the residue, 250 parts of phthalic anhydride, 55 parts of glycerol, and 512 parts of the monoglyceride of linseed oil is heated at 210° C. in an atmosphere of carbon dioxide until the viscosity of a 60% solution of the product in xylene is I+. The resinous material obtained is useful as a component in air-drying or baking enamels and yields flexible, waterproof films having good adhesion to metal surfaces.

The following examples illustrate the preparation of resins from the by-products acids without first separating the mono- and the polycarboxylic by distillation. The by-product acid used in these examples was purified by stirring it with an equal volume of 6% sulfuric acid at approximately 80° C., then drawing off the aqueous layer and washing with hot water, and finally drying by heating the acids to above 100° C. while stirring them.

*Example 6.*—A mixture of 876 parts of the by-product acids and 95 parts of glycerol was heated at 200 to 210° C. until the viscosity of a 50% solution of the product in toluol reached F—. The product, which had an acid number of 5.6, was a very soft, tacky resin, soluble in paraffinic hydrocarbons. It plasticized nitrocellulose, yielding tough, flexible, clear films.

*Example 7.*—A mixture of 288 parts of the by-product acids, 16.1 parts of glycerol, and 18.9 parts of diethylene glycol was heated at 200° C. for 12 hours. The product, a viscous, oily liquid, had a viscosity of C (70% in toluene) and an acid number of 29.5. It was soluble in paraffinic hydrocarbons, and compatible with nitrocellulose.

*Example 8.*—A mixture of 226.5 parts of by-product acids, 68.8 parts of phthalic anhydride, and 54.2 parts of glycerol was heated at 200–205° C. until the gelation time at 235° C. was 11 seconds. The product was a tough, rubbery, tacky resin which had an acid number of 30.5 and a viscosity of R+ (50% in toluol). It was soluble in paraffinic hydrocarbons and compatible with nitrocellulose.

By using the residue from the distillation of the by-product acids obtained in the manufacture of sebacic acid as the source of polybasic acid, the resinous compositions of the alkyd type obtained as described above have many valuable properties. Their solutions have low viscosities and thus they may be used in preparing coating compositions of high solids content which will have a normal viscosity. They are soluble in a wide range of solvents and are compatible with many other resins and materials employed in the manufacture of coating compositions. High percentages of the new resinous compositions may be incorporated in varnishes and lacquers, to impart flexibility and toughness without tackiness, the flexibility and toughness being retained at low temperatures. The high compatibility prevents spuing and blooming, thus providing not only high gloss but excellent gloss retention. Because of the high solids content obtainable in coating compositions of suitable viscosity, heavier films can be laid down which have excellent adhesion to metal or wood surfaces and also to previous coats of lacquer or varnish.

The new resinous compositions are particularly valuable in nitrocellulose lacquers, giving smooth, dry, hard films of excellent adhesion and flexibility and great durability. The compositions themselves are useful in the edge-bonding of veneers and as adhesives for binding metal foil on cork in bottle caps.

We claim:

1. The resinous reaction products of at least one polyhydric alcohol and the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali.

2. The resinous reaction products of at least one polyhydric alcohol, a higher fatty acid, and the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali.

3. The resinous reaction products of at least one polyhydric alcohol, a higher fatty acid glyceride, and the clear amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali.

4. The resinous reaction products of at least one polyhydric alcohol, the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali, and another resin-forming polycarboxylic acid.

5. The resinous reaction products of at least one polyhydric alcohol, a monobasic higher aliphatic carboxylic acid, the clear amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali, and another resin-forming carboxylic acid which is dibasic.

6. The resinous reaction products of glycerine, a monobasic higher aliphatic carboxylic acid, and the clear amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali.

7. The resinous reaction products of glycerine, the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali, and another resin-forming carboxylic acid which is dibasic.

8. The resinous reaction products of glycerine, a monobasic higher aliphatic carboxylic acid, the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali, and another resin-forming carboxylic acid which is dibasic.

9. The resinous reaction products of glycerine, diethylene glycol, and the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali.

10. The resinous reaction products of glycerine, diethylene glycol, the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali, and another resin-forming acid which is dibasic.

11. The resinous reaction products of glycerine, diethylene glycol, phthalic anhydride, and the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali.

12. The resinous reaction products of at least one polyhydric alcohol, phthalic anhydride, a higher fatty acid, and the clear, amber-colored, viscous residue containing long-chained polycarboxylic acids, having an acid number between 140 and 165 and an iodine number between 45 and 60, and being the non-volatile material remaining from the vacuum distillation of by-product acids obtained in the preparation of sebacic acid from castor oil by treatment with alkali.

HAROLD C. CHEETHAM.
CHARLES L. LEVESQUE.